Figure 1:
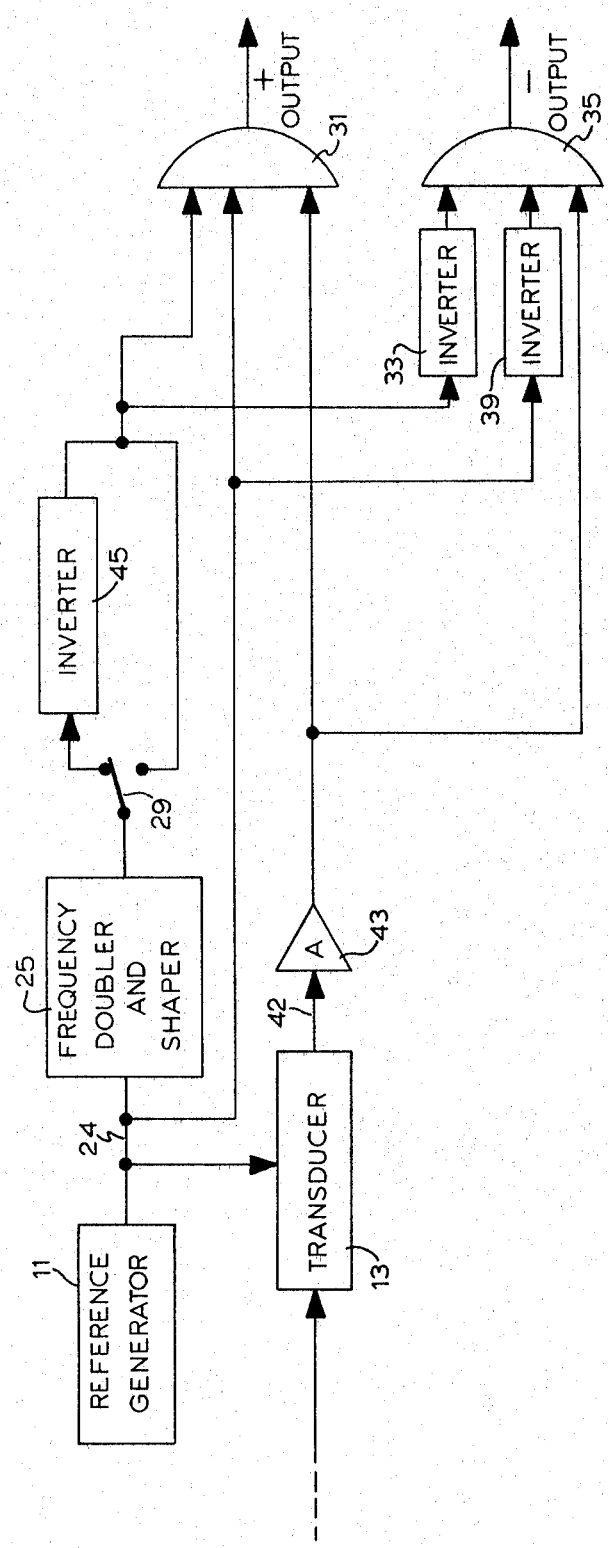

United States Patent Office 3,297,947
Patented Jan. 10, 1967

3,297,947
APPARATUS FOR TWO SIGNAL POLARITY DETECTING USING ALTERNATE QUARTER-CYCLE SAMPLING TO ELIMINATE QUADRATURE ERROR
Hugh E. Riordan, Wyckoff, and Theodore A. Cohen, Metuchen, N.J., assignors to General Precision Inc., Little Falls, N.J., a corporation of Delaware
Filed Dec. 18, 1963, Ser. No. 331,495
10 Claims. (Cl. 324—83)

This invention relates to A.C. polarity detectors and more particularly to an A.C. polarity detector in which the effect of quadrature in an applied signal to the polarity detector is completely eliminated.

In some control and data systems, position transducers providing an A.C. output signal are used to provide an indication of only whether the position transducer pick-off has moved off the null position and in which direction it has moved. The position transducer provides an A.C. output signal of one polarity if the pick-off has moved off the null position in one direction and provides an A.C. signal of the opposite polarity if the pick-off has moved off the null position in the opposite direction. An A.C. polarity detector is used to detect the polarity of the output signal of a position transducer and thereby the direction that the pick-off has moved off null. Certain types of position transducers such as differential capacitors or differential transformers would provide a very sharp null if it were not for the quadrature component in the output signal from these transducers. The quadrature component is an A.C. voltage superimposed on the output signal 90 degrees out of phase with the output signal. The present invention provides an A.C. polarity detector with a relatively simple system for completely eliminating the effect of quadrature in an applied signal. Therefore, when the polarity detector of the present invention is used in combination with a position transducer such as a differential capacitor or differential transformer, a very sharp null is provided.

Accordingly, a principal object of the present invention is to provide an improved A.C. polarity detector.

Another object of the present invention is to eliminate the effect of quadrature in an A.C. polarity detector.

A further object of the present invention is to provide a relatively simple A.C. polarity detector in which means are provided to completely eliminate the effect of quadrature.

A still further object of the present invention is to provide a very sharp null in the output obtained from an A.C. position signal transducer, which has a quadrature component in its A.C. output signal.

These objects are accomplished in accordance with the present invention by providing a signal at double the frequency of the reference signal and precisely aligned in phase with the reference signal. The output signal of the transducer is fed to a pair of gates each of which requires a D.C. polarity coincidence of three input signals to produce an output. The reference signal is fed to one of the gates directly and is inverted and fed to the other gate. Likewise, the double frequency signal is fed directly to one of the gates and is inverted and fed to the other of the gates. If the output signal from the transducer is of one A.C. polarity, then one of the gates will produce output pulses, one for each cycle of reference signal. If the output signal from the transducer is of the opposite A.C. polarity, then the other gate will produce output pulses, one for each cycle of the reference signal. The presence of quadrature in the output signal from the transducer will not cause false output pulses to be produced from the gates because of the fact that the gates have to be enabled by the double frequency signal as well as the reference signals.

Figure 2:
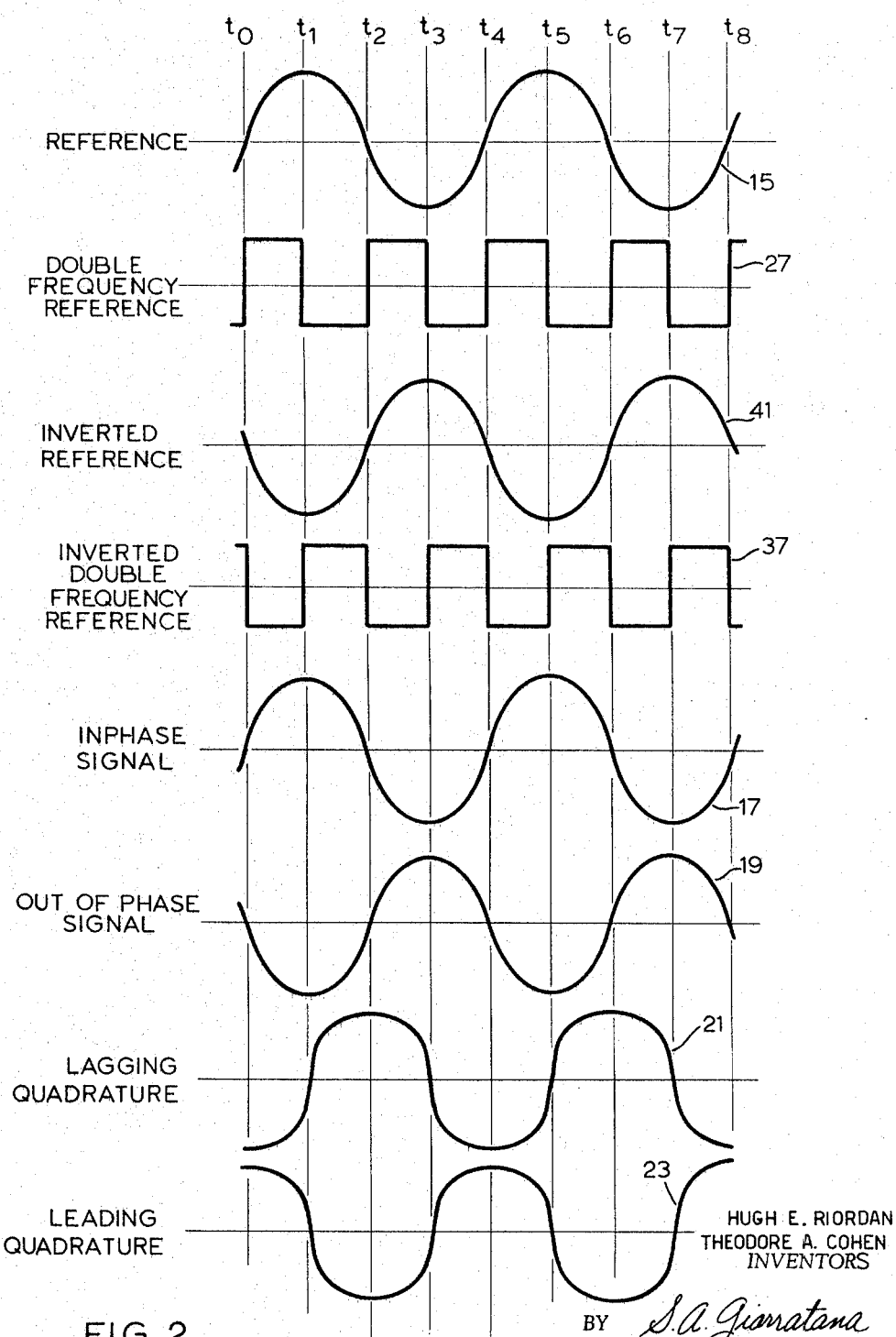

Many other objects and advantages of the present invention will become readily apparent as the following detailed description of the invention unfolds, and when taken in conjunction with the drawings wherein:

FIG. 1 is a block diagram of the A.C. polarity detector of the present invention; and FIG. 2 illustrates waveforms produced in the A.C. polarity detector shown in FIG. 1.

As shown in FIG. 1, the reference signal generator is designated by the reference number 11 and the position transducer is designated by the reference number 13. The output signal of the reference generator 11 energizes the transducer 13 so that the transducer 13 will produce an output signal in phase with the output signal with the reference generator 11 if the pick-off of the transducer 13 has moved off null in the positive direction and will produce an output signal with a phase opposite to that of the output signal of the reference generator 11 if the pick-off of the transducer 13 has moved off null in the negative direction. This relationship is illustrated in FIG. 2 by the waveforms 15, 17 and 19. The waveform 15 represents the output signal of the generator 11; the waveform 17, which is in phase with the signal 15, represents an output signal of the transducer 13 indicating that the pick-off of the transducer 13 has moved off null in the positive direction; and the waveform 19 represents an output signal of the transducer 13 indicating that the pick-off of the transducer 11 has moved off null in a negative direction. The waveforms 17 and 19 actually comprise only signal components of the output signal of the transducer 13 which may produce a quadrature component superimposed on its output signal. The waveform 21 represents a lagging quadrature component, which might be superimposed on the output signal of the transducer 13 and the waveform 23 represents a leading quadrature component which might be superimposed on the output signal of the transducer 13.

In the operation of the polarity detector, it must be known whether the quadrature component is leading or lagging. The phase or sense of the quadrature component can usually be predicted because the quadrature is a characteristic of the pick-off design and the excitation and output ciruit impedances. If the phase of the quadrature component cannot be predicted, it can be determined in advance experimentally. The output signal of the reference generator 11 is fed to the reference input 24 of the A.C. polarity detector of the present invention. The input 24 is connected to the input of a frequency doubler and shaper 25. The output signal of the frequency doubler and shaper 25 is a square waveform represented in FIG. 2 by the waveform 27. As shown in FIG. 2, the output signal of the frequency doubler 25 is between polarities when the output signal of the reference generator 11 changes polarity. The output signal of the frequency doubler 25 is fed to the pole of a switch 29, which should be manually positioned in its lower position if the quadrature component in the output signal of the transducer 13 is lagging and should be positioned in its upper position if the quadrature component in the output signal of the transducer 13 is leading. When the switch 29 is positioned in its lower position, the output signal of the frequency doubler 25 is fed directly to one of three inputs of an AND gate 31 and is fed to the input of an inverter 33, the output signal of which is fed to one of three inputs of an AND gate 35. The output signal of the inverter 33 is represented by the waveform 37 in FIG. 2. The output signal of the reference generator 11 is fed directly to a second input of the AND gate 31 and to the input of an inverter 39, the output of which is represented by the waveform 41 in FIG. 2 and which is fed to a second input of the AND gate 35. The output signal of the transducer 13 is fed to the signal input 42 of the A.C. polarity detector and is then amplified by a preamplifier 43. The amplified signal is fed to a third input of the AND gate 31 and a third input of the AND gate 35. The AND gate 31 will produce an output signal when it receives positive signals applied to all three inputs. Similarly, the AND gate 35 will produce an output signal when it receives positive signals applied to all three inputs. The AND gates 31 and 35 thus are means for detecting the coincidence of positive D.C. polarities applied to the inputs thereof. The AND gate 35 together with the inverters 33 and 39 is a means for detecting the coincidence of a positive D.C. polarity from the transducer 13 with negative D.C. polarities from the reference generator 11 and the frequency doubler 25. If the quadrature component is lagging and the switch 29 is properly positioned in its lower position, and if the output signal of the transducer 13 is in phase with the reference signal generated by the generator 11, then the waveform 15 will be applied to one input of the AND gate 31, the waveform 27 will be applied to another input of the AND gate 31, and the waveform 17 with the waveform 21 superimposed thereon will be applied to the third input of the AND gate 31.

A comparison of the waveforms 15, 27 and 17 will indicate that the AND gate 31 will have positive signals applied to all three inputs between times $t_0$ and $t_1$ and between times $t_4$ and $t_5$. Thus the AND gate 31 will produce output pulses at these times and will produce one output pulse per cycle of the reference signal, to indicate that the output signal of the transducer 13 is in phase with the reference signal. The lagging quadrature component in the output signal of the transducer 13 will not cause any spurious output pulses from the AND gate 31 because the lagging quadrature component will not be positive any time that both the double frequency signal from the frequency doubler 25 and the output signal of the reference generator 11 are positive, as can be seen by comparison of the waveform 21 with the waveforms 15 and 27. Meanwhile, the AND gate 35 will not be producing any output pulses because the signals applied to the AND gate 35 by the inverters 33 and 39 will not both be positive at the same time that the in-phase output signal of the transducer 13 is positive or at the same time that the lagging quadrature component of the output signal of the transducer 13 is positive. This lack of coincidence at the input of the AND gate 35 can be seen by comparing the waveforms 41 and 37 representing the output signals of the inverters 33 and 39 with the waveforms 17 and 21. Thus, when the output signal of the transducer 13 is in phase with the output signal of the reference generator 11 in the presence of a lagging quadrature component, the AND gate 31 will produce output pulses and the AND gate 35 will not.

If the output signal of the transducer 13 is 180 degrees out of phase with the output signal of the reference generator 11 as represented by waveform 19 indicating that the pick-off of the transducer 13 has moved off null in a negative direction, then the AND gate 35 will produce output pulses, one for each cycle of the reference signal and the AND gate 31 will not. The coincidence of positive signals applied to the input of the AND gate 35 causing it to produce output pulses can be seen by comparing the waveform 19 with the waveforms 37 and 41. These three waveforms are all positive between times $t_3$ and $t_4$ and between times $t_7$ and $t_8$ and accordingly the AND gate 35 will produce output pulses at these times when the output signal of the transducer 13 is 180 degrees out of phase with the reference signal. It will be seen in FIG. 2 that the waveform 19 is never positive at the same time that both the waveform 27 and the waveform 15 are positive. Accordingly, the AND gate 31 will not produce any output pulses when the output signal of the transducer 13 is 180 degrees out of phase with the reference signal. The lagging quadrature component does not change when the A.C. polarity of the output signal of the transducer 13 reverses but remains as represented by the waveform 21. Thus no spurious pulses will be produced by either the AND gate 31 or the AND gate 35 due to the lagging quadrature component when the output signal of the transducer 13 is 180 degrees out of phase with the reference signal.

In this manner, the AND gates 31 and 35 represent the A.C. polarity of the output signal of the transducer 13 in the presence of a lagging quadrature component, with output pulses from the AND gate 31 indicating that the output signal of the transducer 13 is in phase with the reference signal and that therefore the pick-off has moved off null in the positive direction and output pulses from the AND gate 35 indicating that the output signal of the transducer 13 is 180 degrees out of phase with the reference signal and therefore that the pick-off has moved off null in the negative direction.

The double frequency signal produced by the frequency doubler 25 in effect enables the AND gate 31 to detect the coincidence of both the reference signal and the output signal of the transducer 13 being positive in only the first and third quadrants of each cycle of the reference signal and the output of the inverter 33 enables the AND gate 35 to detect the polarity coincidence of the output signal of the inverter 39 and the output signal of the transducer 13 both being positive in the second and fourth quadrants of each cycle of the reference signal. The output signals of the frequency doubler 25 and the reference generator 11 together enable the AND gate 31 to detect whether the output signal of the transducer 13 is positive only in the first quadrant of each cycle of the reference signal, whereas the output signals of the inverters 33 and 39 enable the AND gate 35 to detect whether the output signal of the transducer 13 is positive only in the fourth quadrant of each cycle of the reference signal. Because the AND gates 31 and 35 are controlled in this manner by the output signal from the frequency doubler and the reference generator 11, an extremely sharp null is obtained when the transducer 13 produces an output signal in the presence of lagging quadrature.

When the quadrature component is leading instead of lagging, the switch 29 should be positioned in its upper position so that the output of the frequency doubler is disconnected from the first input of the AND gate 31 and the input of the inverter 33 and is connected to the input of an inverter 45, the output of which is connected to the first input of the AND gate 31 and the input of the inverter 33 in place of the output from the frequency doubler 25. In this manner, the phase of the signal applied to the first input of each of the AND gates 31 and 35 is reversed. That is, the signal applied to the first input of the AND gate 31 by the inverter 45 will have the waveform 37 and the signal applied to the first input of the AND gate 35 by the inverter 33 will have the waveform 27. Then if the output of the transducer 13 is in phase with the output signal of the reference generator 11, the AND gate 31 will have, in addition to the waveforms 37 and 15 applied thereto, the signal waveform 17 with the leading quadrature component waveform 23 superimposed thereon. From a comparison of the waveforms 15, 37 and 17, it will be seen that the AND gate 31 will have positive signals applied to all three inputs between times $t_1$ and $t_2$ and between times $t_5$ and $t_6$ and accordingly the AND gate 31 will produce output pulses at these times. Moreover, a comparison of the leading quadrature component waveform 23 with the waveforms 15 and 37 will indicate that the leading quadrature component is never positive at the same time that both waveforms 37 and 15 are positive and accordingly the quadrature component 23 will not cause any spurious output pulses from the AND gate 31. While the in-phase output signal of the transducer 13 is being produced, the AND gate 35 will also have the signal waveform 17 applied thereto with the leading quadrature component waveform 23 superimposed thereon, in addition to the waveforms 41 and 27 applied to its other two inputs. A comparison of the waveform 17 with the waveforms 27 and 41 will indicate that these three waveforms are never positive at the same time and accordingly the AND gate 35 will not produce any output as a result of having the in-phase signal 17 applied thereto. Similarly, a comparison of the leading quadrature component waveform 23 with the waveforms 27 and 41 will indicate that these three waveforms are also never all three positive at the same time and accordingly the AND gate 35 will not produce any output pulses as a result of the leading quadrature component in the output of the transducer 13. Therefore, when an in-phase output signal is produced from the transducer 13 in the presence of a leading quadrature component and the switch 29 is placed in its upper position, the AND gate 31 will produce output pulses and the AND gate 35 will not produce output pulses.

When the transducer 13 produces an output signal 180 degrees out of phase with the reference signal produced by the generator 11 in the presence of a leading quadrature component, the waveform 19 with the waveform 23 superimposed thereon will be applied to the third inputs of the AND gates 31 and 35. With the switch 29 placed in its upper position, the waveform 37 will be applied to the first input of the AND gate 31 and the waveform 27 will be applied to the first input of the AND gate 35. Accordingly, the AND gate 31 will have the waveform 37 applied to one input, the waveform 15 applied to its second input and the waveform 19 with the waveform 23 superimposed thereon applied to its third input. A comparison of the waveform 19 with the waveforms 37 and 15 will indicate that these three waveforms are never all three positive at the same time. As pointed out above, the waveform 23 likewise is never positive at the same time that both the waveforms 15 and 37 are positive. Accordingly, the AND gate 31 will not produce any output pulses. The AND gate 35, on the other hand, will have the waveform 27 applied to its first input, the waveform 41 applied to its second input and the waveform 19 with the waveform 23 superimposed thereon applied to its third input. A comparison of the waveform 19 with the waveforms 27 and 41 will indicate that these three waveforms will all become positive between times $t_2$ and $t_3$ and between times $t_6$ and $t_7$. Accordingly, the AND gate 35 will produce output pulses at these times. As pointed out above, the waveforms 41, 27 and 23 are never all three positive at the same time so no spurious pulses will be produced from the output of the AND gate 35 as a result of the leading quadrature component. Thus when a signal is produced from the output of the transducer 13 180 degrees out of phase with the reference signal produced by the generator 11 in the presence of the leading quadrature component and the switch 29 is in its upper position, the AND gate 35 will produce one output pulse per cycle of the reference signal and the AND gate 31 will not produce any output pulses.

Accordingly, output pulses from the AND gate 31 indicate that the pick-off of the transducer 13 has moved off null in the positive direction and output pulses from the AND gate 35 indicate that the pick-off has moved off null in the negative direction if the switch 29 is positioned correctly according to whether the transducer 13 produces a leading quadrature component output or a lagging quadrature component output.

When the switch 29 is in its upper position, the AND gate 31 is enabled by the output from the inverter 45 to detect whether the output signal of the reference generator 11 and the output signal of the transducer 13 are both positive only in the second and fourth quadrants of each cycle of the reference signal and the AND gate 35 is enabled by the output signal of the inverter 33 to detect whether the output signal of the inverter 39 and the output signal of the transducer 13 are both positive only in the first and third quadrants of the reference signal. The output signal of the reference generator 11 and the output signal of the inverter 45 together enable the AND gate 31 to detect whether the output signal of the transducer 13 is positive only in the second quadrant of each cycle of the reference signal and the output signal of the inverter 33 together with the output signal of the inverter 39 enable the AND gate 35 to detect whether the output signal of the transducer 13 is positive only in the third quadrant of each cycle of the reference generator 11. Because the AND gates 31 and 35 are enabled in this manner, a very sharp null is obtained when the output signal of the transducer has a leading quadrature component.

If no in-phase signal or 180 degrees out-of-phase signal is produced by the transducer 13, neither of the AND gates 31 or 35 will produce an output pulse if the switch 29 is properly positioned, even though the transducer 13 is producing a large quadrature component.

It will be noted that the pulses from the AND gates 31 and 35 occur at different times relative to the reference signal. If it is desirable for the two pulses to occur at the same time relative to the reference signal, this condition can be corrected by sending the output of one of the AND gates 31 or 35 through a delay line of appropriate length.

The above description is a preferred embodiment of the invention and many modifications may be made thereto without departing from the spirit and scope of the invention. For example, the same results can be achieved by having the coincidence detector comprising the AND gate 31 and the coincidence detector comprising the AND gate 35 together with the inverters 33 and 39 detecting the coincidence of differnet sets of D.C. polarities.

We claim:

1. An A.C. polarity detector comprising a signal input, a reference input, frequency doubling means to generate an output signal at a frequency double the frequency of the signal applied to said reference input and being phased relative to the signal applied to said reference input so that said output signal is between polarities when the signal applied to said reference input changes polarity, coincident means having three inputs and adapted to detect the coincidence of a predetermined set of D.C. polarities applied to said three inputs, first circuit means electrically coupling said reference input to one input of said coincidence means, second circuit means electrically coupling said signal input to another input of said coincidence means, and third circuit means for applying the output signal of said frequency doubling means to the third input of said coincidence means.

2. An A.C. polarity detector as recited in claim 1 wherein said third circuit means includes means to selectively reverse the phase of the double frequency signal applied by said third circuit means to the third input of said coincidence means.

3. A polarity detector comprising first coincidence detecting means having three inputs and adapted to detect the coincidence of a first set of predetermined D.C. polarities applied to said three inputs thereof, a second coincidence detecting means having three inputs and adapted to detect a coincidence of a second set of predetermined D.C. polarities applied to said three inputs thereof, a reference input, a signal input, first circuit means electrically coupling said reference input to one input of said first coincidence detecting means and to one input of said second coincidence detecting means, second circuit means electrically coupling said signal input to another input of said first coincidence detecting means and to another input of said second coincidence detecting means, means for generating a signal at double the frequency of the signal applied to said reference input and phased relative to the signal applied to said reference input so that said double frequency signal is between polarities when the signal applied to said reference input changes polarity, and third circuit means electrically coupling said double frequency signal to a third input of said first coincidence detecting means and to a third input of said second coincidence detecting means, said first set of D.C. polarities being selected so that said first coincidence detecting means will detect that a signal applied to said signal input with a quadrature component of predetermined sense superimposed thereon is in phase with the signal applied to said reference input and said second set of predetermined D.C. polarities being selected so that said second coincidence detecting means detects that the signal applied to said signal input with said quadrature component of predetermined sense superimposed thereon is 180 degrees out of phase with the signal applied to said reference input.

4. An A.C. polarity detector as recited in claim 3 wherein said third circuit means includes means for selectively reversing the phase of the double frequency signal applied by said third circuit means to the third input of said first and second coincidence detecting means.

5. A position transducing system comprising a reference A.C. signal generator, a position transducer energized by the output signal of said reference generator and producing with a quadrature component of predetermined phase superimposed thereon an output signal in phase with the output signal of said reference generator when the pick-off of said transducer moves off null in one direction and an output signal 180 degrees out of phase with the output signal of said reference generator when the pick-off of said transducer moves off null in the opposite direction, frequency doubling means to generate an output signal at a frequency double the output signal of said reference generator and being phased relative to the output signal of said reference generator so that the output signal of said frequency doubler is between polarities when the signal applied to said reference input changes polarity, coincidence means having three inputs and adapted to detect the coincidence of a predetermined set of D.C. polarities applied to three inputs thereof, first circuit means for applying the output signal of said reference generator to one input of said coincidence means, second circuit means for applying the output signal of said transducer to another input of said coincidence means, and third circuit means to apply the output signal of said frequency doubling means to the third input of said coincidence means.

6. A position transducing system comprising an A.C. reference signal generator, a transducer energized by the output signal of said generator and producing with a quadrature component of predetermined phase superimposed thereon an output signal in phase with the output signal of said reference generator when the pick-off of said transducer has moved off null in one direction and an output signal 180 degrees out of phase with the output signal of said reference generator when the pick-off of said transducer has moved off null in the opposite direction, first coincidence detecting means having three inputs and adapted to detect the coincidence of a first set of predetermined D.C. polarities applied to said three inputs, second coincidence detecting means having three inputs and adapted to detect the coincidence of a second set of predetermined D.C. polarities applied to said three inputs, first circuit means for applying the output signal of said reference generator to one input of said first coincidence means and to one input of said second coincidence means, second circuit means for applying the output signal of said transducer to another input of said first coincidence means and to another input of said second coincidence means, frequency doubling means for generating a signal double the frequency of the output signal of said reference generator and phase relative to the output signal of said reference generator so that said double frequency signal is between polarities when the output signal of said reference generator changes polarity, and third circuit means for applying said double frequency signal to a third input of said first coincidence means and a third input of said second coincidence means, said first set of D.C. polarities being selected so that said first coincidence means will detect that the output signal of said transducer with said quadrature component of predetermined phase superimposed thereon is in phase with the output signal of said reference generator and said second set of predetermined D.C. polarities being selected so that said second coincidence means will detect that the output signal of said transducer with said quadrature component of predetermined phase superimposed thereon is 180 degrees out of phase with the output signal of said reference generator.

7. An A.C. polarity detector comprising:
  a source of a reference signal;
  a frequency doubler electrically connected to said source to derive therefrom an output signal double the frequency of said reference signal and so phased relative thereto that the double frequency signal is between polarities when the reference signal changes polarity;
  coincidence means having first, second, and third inputs and adapted to detect the coincidence of respective instantaneous polarities applied to said inputs;
  first circuit means electrically coupling said reference signal source to the first input of said coincidence means;
  second circuit means for electrically coupling an input signal to the second input of said coincidence means; and
  third circuit means electrically coupling the double frequency output signal of said frequency doubler to the third input of said coincidence means.

8. An A.C. polarity detector, according to claim 7, including:
  additional coincidence means having first, second, and third inputs and adapted to detect coincidence of respective instantaneous polarities applied thereto;
  respective circuit means, each including an inverter, electrically connecting the first and second inputs of said coincidence means to the first and second inputs, respectively, of said additional coincidence means; and
  conductive means interconnecting the third inputs of said coincidence means and additional coincidence means.

9. A position transducing system including an A.C. polarity detector according to claim 8 and a position transducer connected to be energized from said reference signal source and having an output electrically coupled to said second circuit means and constituting the input signal supplied thereby to the coincidence means.

10. An A.C. polarity detector, according to claim 7, wherein said third circuit means includes a phase inverter and means selectively operable to bypass said inverter.

References Cited by the Examiner

UNITED STATES PATENTS 2,957,137 10/1960 Robinson _____ 324—83
2,984,785 5/1961 Biderman _____ 324—87

WALTER L. CARLSON, *Primary Examiner.*

P. F. WILLE, *Assistant Examiner.*